Jan. 14, 1958     J. D. KIRSCHMANN     2,819,826
FERTILIZER DISTRIBUTOR

Filed July 3, 1956     3 Sheets-Sheet 1

John D. Kirschmann
INVENTOR.

Jan. 14, 1958  J. D. KIRSCHMANN  2,819,826
FERTILIZER DISTRIBUTOR

Filed July 3, 1956  3 Sheets-Sheet 2

John D. Kirschmann
INVENTOR.

BY
Attorneys

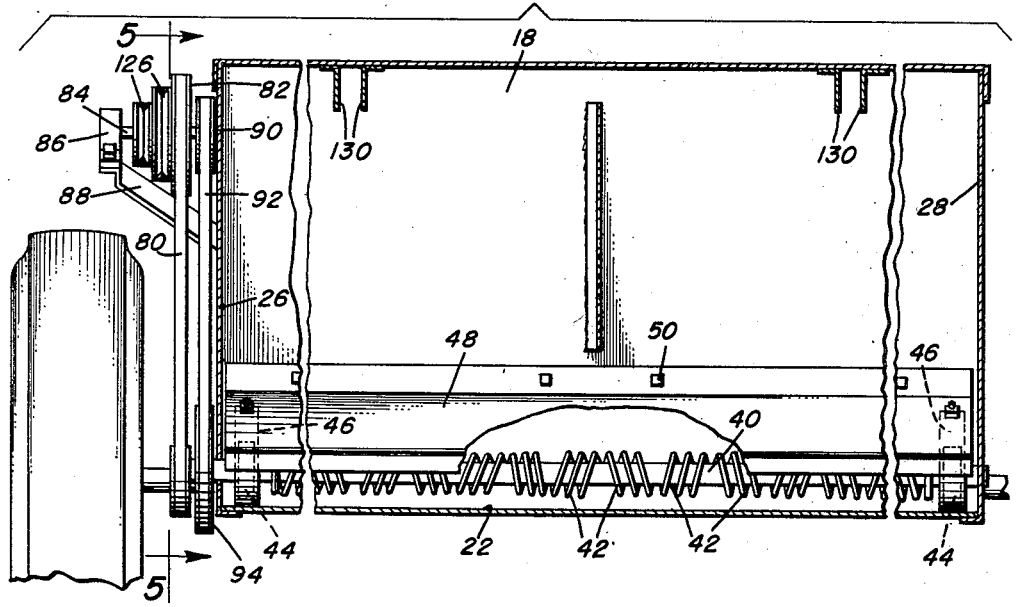
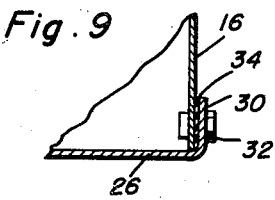
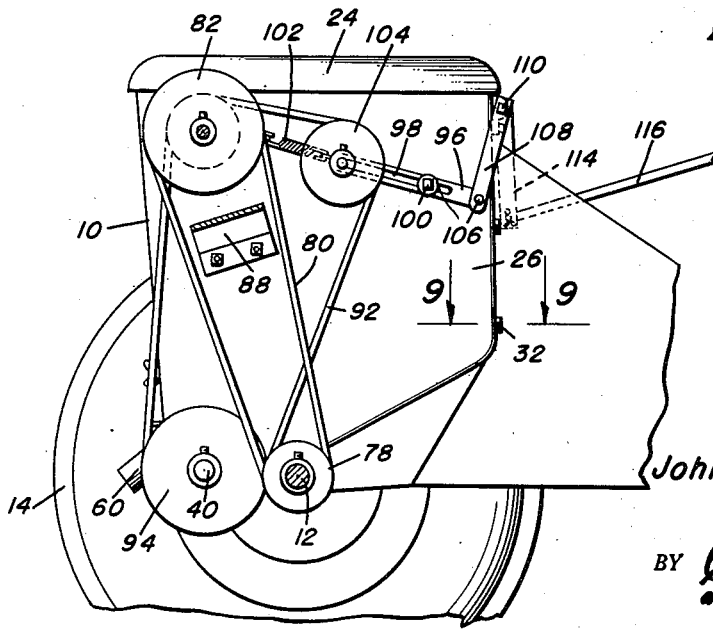

United States Patent Office 2,819,826
Patented Jan. 14, 1958

2,819,826

FERTILIZER DISTRIBUTOR

John D. Kirschmann, Dickinson, N. Dak.

Application July 3, 1956, Serial No. 595,730

8 Claims. (Cl. 222—272)

This invention comprises a novel and useful fertilizer distributor and more particularly relates to a device for automatically dispensing an adjustable quantity of fertilizer or granular material in response to movement of the same. The present application constitutes a continuation-in-part of my prior copending application Serial No. 552,321, for Fertilizer Spreader, filed December 12, 1955, now Patent No. 2,804,998, issued September 3, 1957.

The principal object of this invention is to provide a distributing device of an inexpensive and simple construction and yet which will enable the fertilizer or other material of a granular nature to be retained therein and to be accurately and adjustably dispensed therefrom in an improved manner.

An important object of the invention is to provide a device in accordance with the foregoing object in which the dispensing mechanism is provided with a yieldable safety release construction.

Yet another object of the invention is to provide an improved fertilizer dispenser in conformance with the above mentioned objects and having means whereby the rate at which fertilizer or other granular material is dispensed therefrom may be accurately measured.

Yet another object of the invention is to provide a fertilizer distributor wherein the hopper shall have moisture-proof sealed joints between the walls thereof.

A further object of the invention is to provide a device in conformance with the above mentioned objects wherein the hopper of the device shall have an improved lid construction with a closure spring means therefor.

An additional object of the invention is to provide a distributing and spreading device as set forth herein before wherein the hopper shall have a contour and shape for the efficent feeding of the material to the bottom of the hopper together with an auger of an improved construction for feeding the fertilizer along the bottom of the hopper to a plurality of discharge spouts therefor.

Yet another object of the invention is to provide a fertilizer distributing device in compliance with the preceding objects wherein the auger for feeding the material to the plurality of discharge spouts shall have a variable drive means therefor and wherein the bearings of the auger shall be provided with protective baffles, and wherein the auger shall be vertically adjustable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a view in vertical longitudinal section through the hopper construction of the apparatus, parts being broken away;

Figure 5 is a vertical sectional view taken substantially upon the plane indicated by section line 5—5 of Figure 4 and showing the driving means for the auger of the spreader;

Figure 9 is yet another detail view taken substantially upon the plane indicated by section line 9—9 of Figure 5.

In accordance with this invention there is provided a spreader for fertilizer or other material in the form of a cart consisting of a hopper 10 mounted by a supporting axle or axles 12 having supporting and driving wheels 14 thereon.

Figure 3:
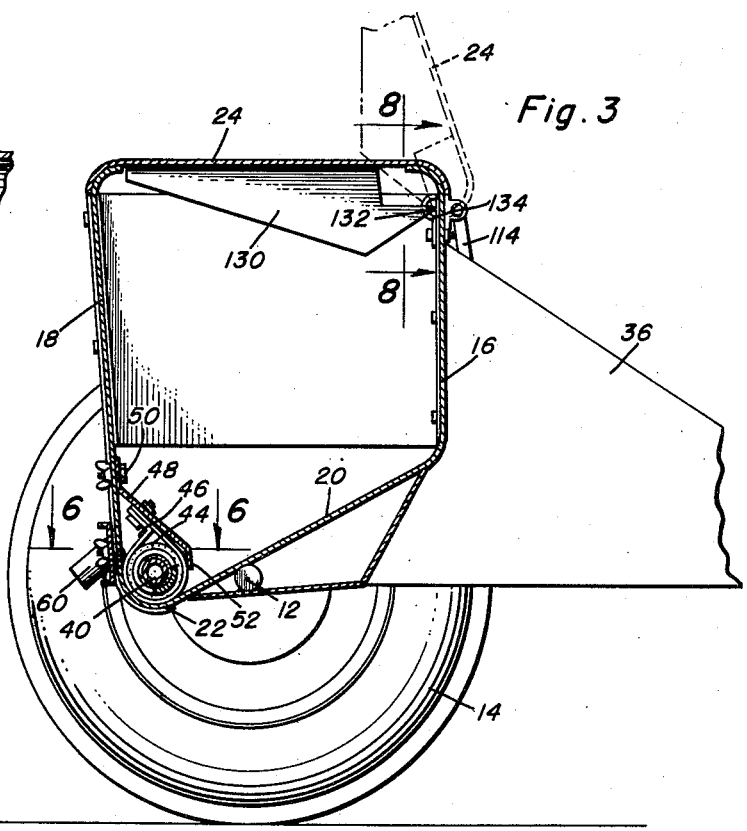
Figure 3 is a vertical transverse sectional view taken upon an enlarged scale substantially upon the plane indicated by section line 3—3 of Figure 2.

Referring primarily to Figure 3 it will be seen that the hopper consists of front and rear walls 16 and 18 together with a downwardly sloping bottom wall 20 which inclines downwardly from the front wall towards its junction with the rear wall to thus provide a dished trough 22 extending across the length of the hopper. Hinged to the top of the front wall in the manner set forth hereinafter is a closure or cover 24.

As will be best apparent from Figure 4, the hopper is provided with side or end walls 26 and 28 and as shown in Figure 9 the end walls are provided with flanged extremities 30 which overlap the front and real walls, and are secured thereto as by fastening bolts 32, with suitable sealing means 34 being interposed therebetween. This sealing means may consist of calking material, gaskets and the like and serve to provide a moisture-proof joint between the walls forming the hopper.

From the central portion of the front wall 16 of the hopper extends a beam 36 which at its forward end is provided with a clevis 38 whereby the same may be coupled to the drawbar of a tractor or other towing vehicle.

Figure 7:
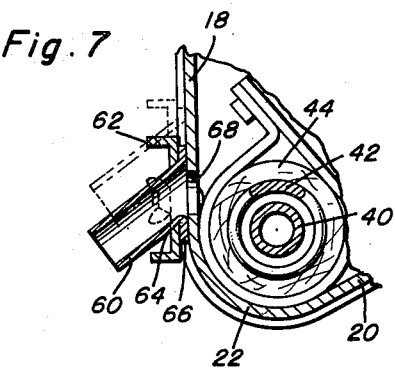
Figure 7 is a detail view in vertical transverse section taken substantially upon the plane indicated by section line 7—7 of Figure 6 and showing the relative arrangement of the auger screw and of the discharge spouts of the device.

Referring now primarily to Figures 3, 4 and 7, it will be seen that there is provided an auger shaft 40 disposed in the trough 22 and having its ends extending through the two side walls 26 and 28 of the hopper. Secured to the shaft are a plurality of sets of spiral members 42, adjacent members being spiralled in opposite directions, and each spiral member having one end suitably fixedly secured to the auger shaft 40, with its other end unattached to said shaft.

Suitable packing means are provided where the shaft 40 extends through the end walls of the hopper, and any suitable type of journal bearings 44 are provided at suitable locations along the length of the shaft, these bearings being supported by clamping straps or brackets 46 which are secured to the underside of a downwardly inclined baffle or plate 48 secured to the inside surface of the wall 18 of the hopper as by fasteners 50, this flange or plate having a downturned lip 52. The arrangement is such that the plate 48 serves to overlie and protect the journal bearings for the auger shaft.

Figure 10:
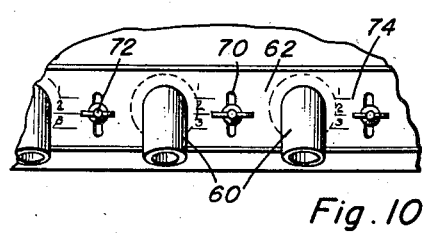
Figure 10 is a fragmentary detail view in elevation showing a portion of the discharge spouts of the device.

A plurality of discharge spouts 60, see Figures 3, 7 and 10 particularly, are carried by and incline rearwardly from a plate 62. As shown in Figure 7, the plate 62 is provided with a plurality of apertures 64 through which the upper ends of the discharge spout 60 extend, the latter having flanged extremities 66 which are thus retained between the plate 64 and the wall 18 of the hopper. Registering with each of the discharge spouts, the rear wall of the hopper has discharge openings 68.

Figure 6:
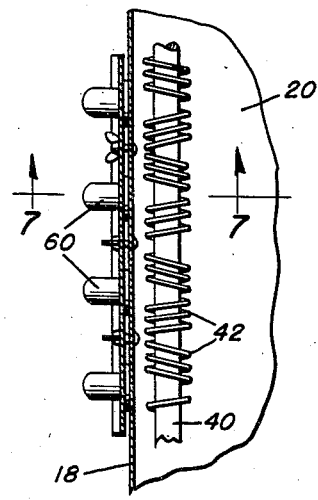
Figure 6 is a horizontal sectional detail view taken substantially upon the plane indicated by section line 6—6 of Figure 3 and showing certain details of the structure and arrangement of the auger screw and the dispensing spouts of the device.

From a comparison of Figure 6 it is seen that each of the pairs of reversely spiraled members 42 is so disposed with respect to each discharge spout that upon rotation of the shaft a pair of reversely directed spirals to serve to sweep material towards the spout disposed therebetween. As will be readily apparent from inspection of Figure 7, it is evident that the vertical height of discharge spout with respect to the opening 68 of the rear wall of the hopper will serve to regulate the rate of flow of material from that discharge spout. Accordingly, means are provided whereby the plate 62 with the spouts carried thereby may be vertically adjusted. For this purpose, as shown in Figure 10, the plate is provided with a plurality of vertically elongated slots 70 and bolts and wing nuts 72 carried by the rear wall of the hopper extend through the slots and provide a means whereby the plate may be vertically adjusted, as will be apparent by the comparison of the full and dotted line showing in Figure 7.

In order to facilitate the obtaining of a desired adjustment of the plate and discharge spouts with respect to the discharge openings of the rear wall of the hopper, suitable indicia 74 may be provided upon the plate 62 adjacent each of the fastening means 72.

Means are provided for imparting rotation to the fertilizer feeding auger screw by movement of the device. For this purpose, as will be best apparent from Figures 4 and 5, the axle 12 is provided with a pulley 78 adjacent the end wall 26, which pulley is connected as by a belt 80 with a pulley 82 secured to a stub axle 84. The latter has one end suitably journaled in the end wall 26, and has its other end mounted in a bearing 86 carried by the bracket 88, as shown in Figure 4. A further pulley 90 carried by the stub axle 84 is connected by a belt 92 with the pulley 94 secured to the end of the auger shaft 40 in order to impart rotation to the latter in response to rotation of the wheels.

As shown in Figure 5 there is provided a slack take-up means for the belt 92, which constitutes a clutch for selectively establishing or breaking an operative driving connection between the wheels of the device and the feed auger shaft.

Figure 1:
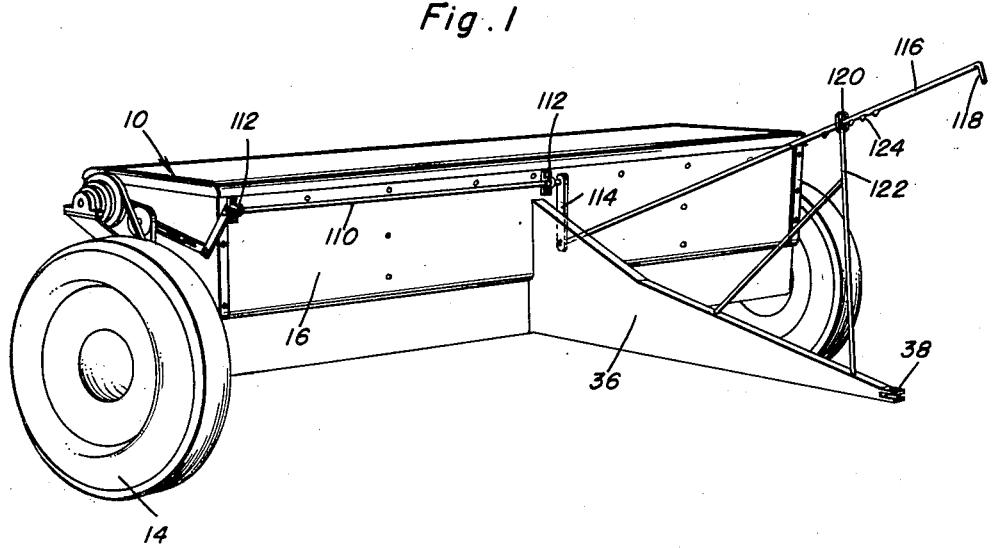
Figure 1 is a perspective view in front elevation of the fertilizer spreader incorporating therein the principles of this invention.
Figure 2:
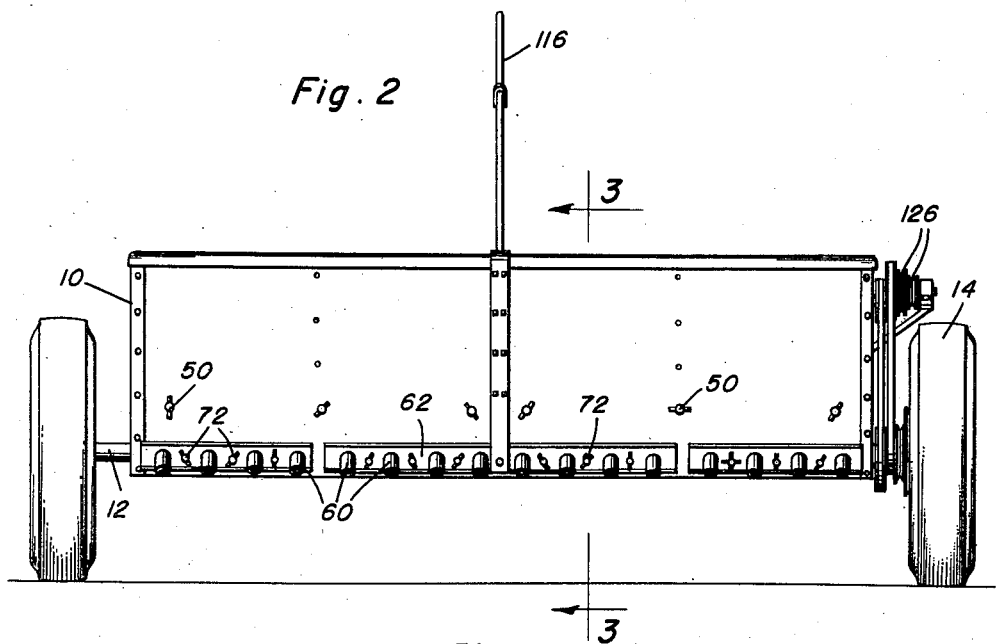
Figure 2 is a rear elevation view of the same.

For this purpose, there is provided as shown in Figure 5 a link 96, slotted as at 98 for slicing reception upon a bolt 100 secured to the end wall 26 of the hopper, a tension spring 102 serving to return this link towards the left. Journaled upon the link is an idler pulley 104 which engages the belt 92. At its end remote from the spring 102, the link is pivoted as at 106 to a crank arm 108 secured to a shaft 110, the shaft 110 in turn being journalled as at 112, see Figure 1, to the front wall of the hopper. Adjacent the beam 36, the shaft 110 is provided with an actuating crank arm 114 to which is connected the lower end of the actuating rod 116 having a handle 118. This rod extends through the eye portion 120 of a standard 122 which is secured to and rises above the beam 36, and there are preferably provided longitudinally spaced projections 124 upon the rod 116 to enable the same to be secured in an adjusted position, whereby to move the pulley 104 into a tensioning position for the belt 92 or into a tension releasing position.

It will thus be apparent there is provided a means for selectively tensioning or releasing the belt 92 and thereby establishing a clutch actuation for the auger shaft.

As will be observed from Figure 4, the stub axle 84 is provided with a plurality of pulleys 126 which are of different diameters. This provides a means whereby the belt 80 may be shifted from one pulley to another in order to provide different driving ratios for the auger shaft from the axle shaft.

Figure 8:
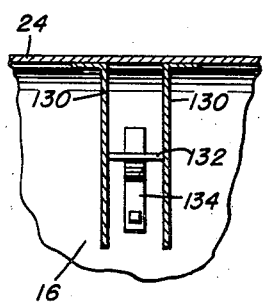
Figure 8 is a detail view taken upon an enlarged scale substantially upon the plane indicated by section line 8—8 of Figure 3 and showing certain details of the hinge for the hopper cover.

Referring particularly to Figures 3, 4 and 8, it will be seen that there are provided a plurality of parallel brackets 130 which are secured to the inside surface of the cover 24. These brackets constitute hinges which are secured by hinge pins 132 to the hinge members 134 carried by the front walls 16. The forward and rearward ends of the cover member 24 are rounded as shown to provide smooth closing action upon the upper rim of the hopper.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a fertilizer distributor or the like, a hopper for receiving fertilizer, said hopper having a trough at its lower portion, an auger in said trough extending through an end wall of said hopper, means for driving said auger, a plurality of spaced discharge openings in the hopper adjacent the auger and disposed above the bottom of said trough, discharge spouts for said openings and a plate in said hopper secured to the rear wall thereof and inclined downwardly therefrom and overlying said auger.

2. The combination of claim 1 and means below said plate for journaling said auger upon said plate.

3. The combination of claim 1 including means for vertically adjusting said spouts relative to said openings whereby to control the rate of flow of fertilizer through said spouts, said last means including a plate, means securing said spouts to said plate, fasteners for securing said plate to said hopper in vertically adjusted position relative to said discharge openings.

4. The combination of claim 3 wherein said plate has openings therein, each spout extending through a plate opening into registry with a discharge opening.

5. The combination of claim 4 including flanges on said spouts clamped between the plate and a wall of the hopper.

6. In a fertilizer distributor, a hopper having side walls and downwardly convergent front and rear walls between said side walls joined together by a rounded bottom wall portion defining a trough in the lower region of the hopper, a combined feeding and distributor unit mounted in said trough and including a rotatable shaft extending between said side walls and disposed with its axis parallel to the rounded inner surface of said bottom wall portion, auger elements mounted substantially concentrically on said shaft and including at least one pair of adjacent spiral members extending in opposite directions about said shaft so as to feed material inwardly toward the adjacent ends thereof, said rear wall having a discharge opening therein opposite said adjacent ends of the spiral elements, and a discharge spout secured to the front wall, said spout being adjustable to selectively alter the effective area of said discharge opening.

7. In a fertilizer distributor, a hopper having side walls and downwardly convergent front and rear walls between said side walls joined together by a rounded bottom wall portion defining a trough in the lower region of the hopper, a combined feeding and distributor unit mounted in said trough an including a rotatable shaft extending between said side walls and disposed with its axis parallel to the rounded inner surface of said bottom wall portion, auger elements mounted substantially concentrically on said shaft and including at least one pair of adjacent spiral members extending in opposite directions about said shaft so as to feed material inwardly toward the adjacent ends thereof, said rear wall having a discharge opening therein opposite said adjacent ends of the spiral elements, a baffle member secured to said front wall above said auger and extending downwardly therefrom in inclined relation toward said rear wall, and a plurality of bearing members for said shaft secured to the undersurface of said baffle member.

8. The assembly as desfined in claim 7 wherein the means mounting said bearing members comprises a strap substantially completely encircling each bearing member and being secured to said baffle member, each of said bearing members being of circular outer form and the strap member surrounding each bearing member being of substantially the same curvature as said rounded bottom wall portion and being nested therein.

References Cited in the file of this patent

UNITED STATES PATENTS

| | | |
|---|---|---|
| 111,421 | Barns et al. | Jan. 31, 1871 |
| 2,522,693 | Stiteler | Sept. 19, 1950 |
| 2,631,760 | Hoppes | Mar. 17, 1953 |
| 2,717,104 | Hoppes | Sept. 6, 1955 |